(No Model.)
W. R. HAMPTON.
ANIMAL TRAP.
No. 330,695. Patented Nov. 17, 1885.
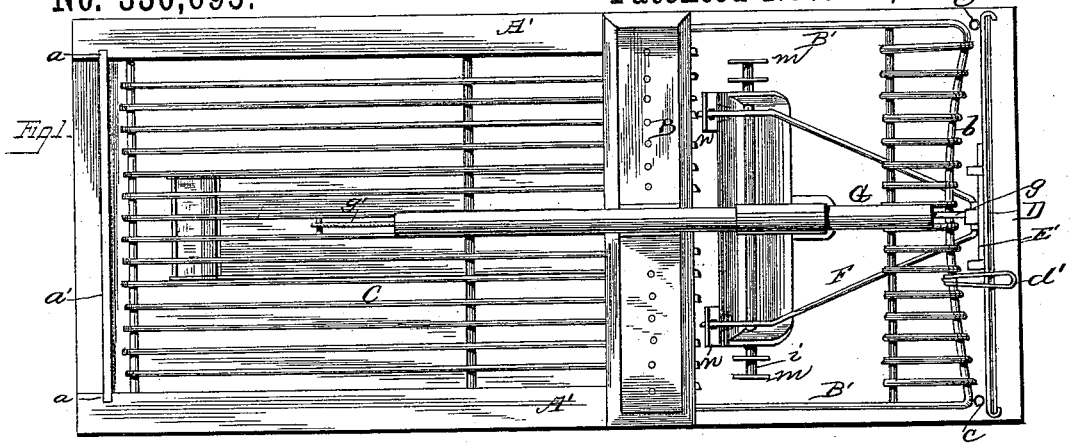
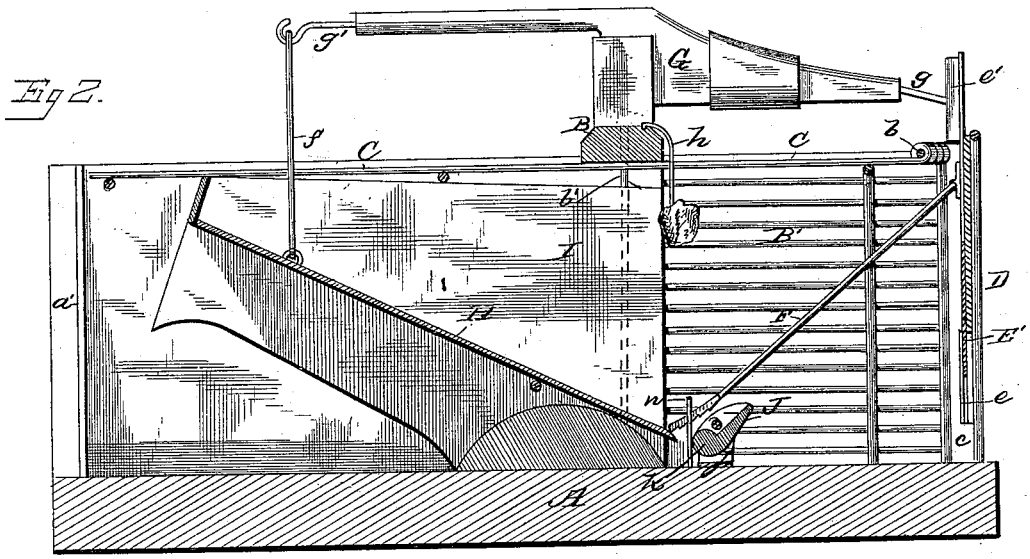
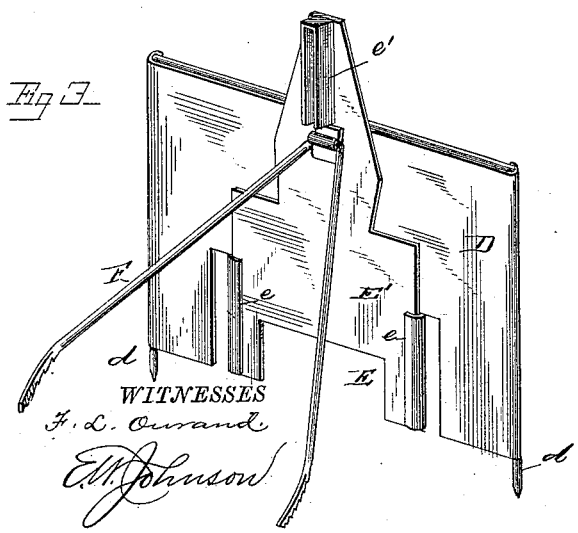
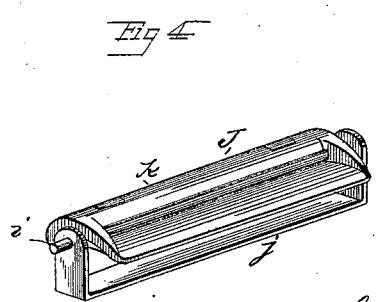
WITNESSES
F. L. Ourand
E. M. Johnson
William R. Hampton
INVENTOR
Attorney

UNITED STATES PATENT OFFICE.

WILLIAM R. HAMPTON, OF BOWLING GREEN, KENTUCKY, ASSIGNOR OF ONE-HALF TO T. J. SULLIVAN, OF SAME PLACE.

ANIMAL-TRAP.

SPECIFICATION forming part of Letters Patent No. 330,695, dated November 17, 1885.

Application filed November 1, 1884. Serial No. 147,020. (No model.)

*To all whom it may concern:*

Be it known that I, WILLIAM R. HAMPTON, a citizen of the United States, residing at Bowling Green, in the county of Warren and State of Kentucky, have invented certain new and useful Improvements in Animal-Traps; and I do hereby declare the following to be a full, clear, and exact description of the invention, such as will enable others skilled in the art to which it appertains to make and use the same.

My invention relates to certain new and useful improvements in self-setting animal-traps; and it consists in the special construction and combination of the parts whereby an animal after entering the front portion of the trap, in attempting to reach the bait, will release the door-supporting means, so as to cause said door to fall, said front portion of the trap being connected to the rear portion, having a tilting door, so that when the animal goes into said passage-way to the rear portion of the trap the tilting door will be depressed, and will again set the trap, as will be hereinafter fully set forth and pointed out in the claims.

In the accompanying drawings, which illustrate my improvement, Figure 1 is a plan view. Fig. 2 is a sectional view, and Figs. 3 and 4 are detail perspective views.

A represents the base of the trap, which is provided with two upright solid side pieces, A' A', which are connected near their upper front portion by a transverse bar, B, the rear portion of these side pieces being provided with vertical grooves $a$ for the reception of a removable transparent door, $a'$. The front portion of the trap is provided with open wire-work sides B' B', and the entire top of the trap is covered by a wire-work top, C, which is supported by suitable transverse bars, which at the rear portion of the trap enter the side pieces, A' A', and at the front portion the transverse bars are bent so as to have vertical portions which enter the base A. The front wire, $b$, of the top is curved inwardly, as shown in Fig. 1, so as to provide a space wherein the sliding door at the front portion of the trap can operate, and immediately in front of the wire sides B' B' are two vertical pillars, $c\ c$, against which the front portion of the trap will abut. The front portion, D, is provided at its lower portion with two projecting-pins, $d\ d$, which enter perforations in the base A, and the upper portion is secured to the top by a hook, $b'$, which is attached to the transverse wire $b$ of the top. By this means, when the hook is raised, the front portion, D, of the trap may be removed, so access can be had to the bait-hook. The inner portion of the front D is provided at its base with an opening, E, adjacent to which the metal is slitted and turned upon itself so as to provide guideways within which $e$, slides the door E'. This door is provided at its upper portion with a forwardly-projecting grooved portion, $e'$, beneath which is pivoted a bar, F, which diverges from its pivoted portion, its ends being bent parallel with each other and serrated, as shown.

To the central portion of the transverse bar B is secured a bracket, which pivotally supports a lever, G, the front portion of said lever being provided with a projecting pin, $g$, which enters the groove in the projecting portion $e'$ of the sliding door E', the rear portion of the lever being provided with a hook, $g'$, which engages with a looped wire, $f$, which is attached at its lower end to the rear portion of the tilting platform H.

The transverse bar B has attached thereto bait-hooks $h\ h$, which depend downwardly within the front compartment of the trap adjacent to the vertical walls I of the passage-way, between which the platform H is pivoted.

To the upper side of the base A, in front of the passage-way, between the compartments and under the bait-hook $h$, is secured a tripping-platform, J, which is secured to the base by means of a bracket, $j$, the ends of which are perforated for the reception of the bar $i$, which passes through this platform. The rear portion of said platform is curved, as shown at $k$, and is provided on its upper surface with plates, immediately in front of which to the base of the trap are secured upwardly-projecting plates $n$, which are provided with vertical slots, through which pass the ends of the bar F. Longitudinal movement of the tripping-platform is prevented by upwardly-projecting plates $m$, against which the ends of the rod $i$ abut.

To set the trap, it is only necessary to depress the rear end of the lever G. This operation raises the sliding door E', which is held in a raised position by the bar F, the serrated ends engaging with the lower portion of the vertical slots in the upwardly-projecting plates n.

When an animal enters the trap in attempting to reach the bait, he will step upon the tripping-platform J, depressing its front portion, thereby causing its rear portion to raise, which contacts with the ends of the bar F and releases the same from the plates n, thus allowing the door to fall and confining the animal in the front compartment. The animal, when he finds himself thus encaged, will pass upon the platform H, and his weight upon the rear end of the same will cause said platform to be depressed, so as to provide an opening through which he can enter the rear compartment of the trap. The depressing of this platform will cause a resetting of the trap.

The front end of the lever G is constructed so as to be heavier than its rear portion, so as to counterbalance the same and the platform H, so as to keep said platform in such a position that the opening at the rear end will always be closed except when the weight of the animal is upon it, and the front portion of this lever does not engage with the projecting portion e' of the sliding door only when in the act of raising said door, the groove being of such a length as to allow this play. Vertical wires b' extend from the transverse bar B to the base A on each side of the side walls, I, of the passage-way between the compartments.

I claim—

1. In a self-setting animal-trap, a sliding door having a bar with serrated ends pivotally attached thereto so as to engage with slotted brackets, a pivoted tripping-platform secured under the ends of said bar so as to engage therewith and release the same, a pivoted platform located in passage-way between the front and rear compartments and connected to a pivoted lever which engages with the sliding door, the parts being combined and organized substantially as shown.

2. In an animal-trap, a sliding door having pivoted thereto a bar with serrated ends, said serrated ends passing through slotted brackets, and a tripping-platform pivotally secured under the ends of said arm so as to release the same when weight is placed upon the front portion thereof, substantially as shown, and for the purpose set forth.

3. In an animal-trap constructed substantially as described, the front D, having a central opening, E, adjacent to which the material of which the portion D is made is slitted and turned upon itself so as to provide guideways for a sliding door, substantially as shown, and for the purpose set forth.

4. In an animal-trap constructed substantially as described, the bait-hooks depending into the front compartment, said front compartment being closed by a removable section, D, having at its lower portion projecting pins d, the upper portion being retained in position by a hook, d', substantially as shown, and for the purpose set forth.

5. In an animal-trap consisting of a front and rear compartment which are connected to each other by a passage-way, a sliding door, E', having a pivoted bar, F, attached thereto, the serrated ends of which engage with slotted brackets, a tripping-platform constructed, as shown, and located under the ends of said bar, a lever, G, engaging with the sliding door E' at its front end, its rear end being connected to the rear portion of the tripping-platform H, the front portion of said lever being weighted, for the purpose set forth.

In testimony whereof I affix my signature in presence of two witnesses.

WILLIAM R. HAMPTON.

Witnesses:
F. P. SMITH,
J. T. WILKERSON.